United States Patent [19]

Cordes et al.

[11] 4,053,457

[45] Oct. 11, 1977

[54] MANUFACTURE OF POLYAMIDES

[75] Inventors: Claus Cordes, Weisenheim; Franz Zahradnik, Ludwigshafen, both of Germany

[73] Assignee: BASF Aktiengesellschaft, Rheinland-Pfalz, Germany

[21] Appl. No.: 644,960

[22] Filed: Dec. 29, 1975

[30] Foreign Application Priority Data

Jan. 15, 1975 Germany .............................. 2501348

[51] Int. Cl.² ............................................ C08G 69/46
[52] U.S. Cl. ................. 260/78 L; 260/78 S; 260/96 R; 260/239.3 A
[58] Field of Search ............ 260/78 L, 78 S, 299.3 A, 260/96 R

[56] References Cited

U.S. PATENT DOCUMENTS

| | | | |
|---|---|---|---|
| 3,361,721 | 1/1968 | Markel et al. | 260/78 L |
| 3,449,220 | 6/1969 | Geisler et al. | 260/78 L X |
| 3,598,537 | 8/1971 | Kraft | 23/272.5 |
| 3,639,659 | 2/1972 | Nieswandt et al. | 260/78 L |
| 3,905,946 | 9/1975 | Nieswandt et al. | 260/78 L |

*Primary Examiner*—Lucille M. Phynes
*Attorney, Agent, or Firm*—Keil, Thompson & Shurtleff

[57] ABSTRACT

A process for the manufacture of polyamides from ε-caprolactam and/or other polyamide-forming starting compounds by polymerization and subsequent extraction of the polymer. The extract containing solvent, monomer and oligomers is concentrated in the absence of atmospheric oxygen, the surfaces which come into contact with the extract being made of materials which are inert under the conditions of the concentration process, and the concentrate, without further purification or separation, is polymerized by itself or together with other polyamide-forming starting compounds.

9 Claims, No Drawings

MANUFACTURE OF POLYAMIDES

Polyamides based on ε-caprolactam are used for the manufacture of fibers, films and moldings. However, the polymerization of ε-caprolactam to poly-ε-caprolactam, hereinafter referred to as nylon 6, only takes place incompletely, and the crude polymer contains 10% or more extractables which in part consist of monomeric ε-caprolactam. For subsequent use of the polymer, these constituents must be removed by extraction, preferably in several stages, with hot water. In the manufacture of nylon 6, an average of from 1 to 5 m³ of extracts, having a solids content of from about 2 to 10 percent by weight, is produced per tonne of nylon. These extracts are frequently run to waste and in that case constitute a substantial pollution of the environment. Furthermore the solids contained in the extracts cause the yield of the polymerization to be lower. Various attempts have therefore been made to work up these extract liquors.

It has been disclosed to recover the caprolactam contained in the wash liquors by first evaporating the water and then separating the caprolactam from the less volatile constituents by distilling the residue. Processes of this type are described, e.g., in British Pat. No. 1,297,263, in U.S. Pat. No. 3,459,640 and in French Pat. No. 1,535,851. German Pat. No. 913,172 and German Published Application No. 1,770,088 disclose processes in which the lactam contained in the extract liquors is extracted therefrom with non-aqueous solvents. All these processes have the disadvantage that the caprolactam obtained is of insufficient quality for direct use for polymerization and must be purified in further stages. In addition, the oligomers contained in the extract liquors are not worked up in the above processes; they are, as before, discharged into the sewer or have to be burnt. For this reason, German Pat. No. 950,726 and German Printed Application No. 1,272,297 disclose processes by which these oligomers may be decomposed to caprolactam. On the other hand, Japanese Patent Application No. 73/10,477 and Japanese Patent Application No. 73/10,476 disclose processes by which caprolactam, obtained by the above methods of working up, is purified further. All these processes suffer from the fact that they are relatively expensive and cannot operate without any wastage of, e.g., decomposition catalysts, oxidizing agents, filter cakes, off-gases or residual oligomers.

It is an object of the present invention to provide a technically less complex method of working up extract liquors from the manufacture of nylon 6, in which no objectionable by-products remain.

We have found that this object is achieved and that the above difficulties in the manufacture of polyamides from ε-caprolactam and/or other polyamide-forming starting compounds by polymerization, and subsequent extraction of the polymer, are avoided if the extract, which contains solvent, monomer and oligomers, is concentrated in the absence of atmospheric oxygen, the surfaces which come into contact with the extract being made of materials which are inert under the conditions of the concentration process, and the concentrate, without further purification or separation, is polymerized by itself or together with other polyamide-forming starting compounds.

An advantageous embodiment whereby the process may be carried out continuously is to recycle the extract, after it has been concentrated, to the polymerizaton stage.

The extraction of the high molecular weight polymer is carried out batchwise in one or more stages, or continuously, using solvents, preferably water, at from 20° to 150° C, under atmospheric or superatmospheric pressure.

The process according to the invention is preferentially applied to aqueous extracts such as are obtained from a one-stage or multi-stage, batchwise or continuous extraction of crude nylon 6. However, non-aqueous extracts may also be used. It is also possible to work up the extracts together with other liquors contained lactam, which are obtained, e.g., from the granulation cooling baths or by condensation of vapors from the polymerization, provided they do not contain any extraneous impurities. The solids content of the extract liquors is as a rule more than 1 percent by weight and preferably more than 4 percent by weight. The process is carried out even more advantageously at higher solids contents. The proportion of oligomeric compounds in the extract may be more than 10% and up to 30 percent by weight, based on solids content. Preferably, the extract liquors used do not contain any foreign matter originating from soluble additives, e.g. from dyes or processing assistants admixed during polymerization. In the process of the invention, contact of the extract liquors, at elevated temperatures and higher concentrations, with atmospheric oxygen is strictly avoided.

In carrying out the process of the invention it is essential that all parts which come into contact with the extract, both during extraction, e.g. in cooling baths, and during condensation of vapors from the polymerization, and during subsequent storage and handling of the collected extract liquors and processing thereof, should be made of materials which are inert toward the extract under the prevailing conditions. This means that the materials used neither react with the extract, nor cause any alteration or contamination thereof, under the process conditions. In particular, rust formation, and the dissolution of metal ions, e.g. iron ions, must be avoided. It is possible to carry out a simple check, for example by trace analysis of the extract liquors. It has proved advantageous to use stainless steel for all surfaces which comes into contact with the product.

To carry out the process of the invention, the extracts are suitably concentrated in a first stage, e.g. in a kettle, by distilling off the solvent until they reach a concentration of, advantageously, at most 70 percent and preferably at most 60 percent, by weight. In this stage, temperatures of 170° C, and preferably 150° C, are as a rule only exceeded for short periods, if at all. This concentration of the extract can also advantageously be carried out continuously, e.g. in Robert evaporators, falling film evaporators, thin film evaporators or other designs of evaporators. In a preferred embodiment, the process of concentration is carried out in a multi-stage evaporator unit. In that case it may at times be advantageous to carry out the evaporation under reduced pressure or super-atmospheric pressure in some of the stages. The product obtained from this concentration process is suitably subsequently evaporated further, from solids concentrations of, e.g. more than 50 percent, and preferably more than 60 percent, by weight in a second and continuous stage, which is advantageously carried out at from 130° to 210° C and preferably from 140° to 170° C. The residence times of the product in the evaporator at these pressures advantageously do not exceed 30 minutes, and preferably do not exceed 10 minutes. Luwa or Sambay thin film evaporators are examples of designs particularly suitable for carrying out the process of the invention. Apart from thin film evaporators, other evaporators may also be used provided they permit adherence to the conditions of the invention, and in particular to the requisite residence times. For example, falling film evaporators of low working volume may be used.

According to the process of the invention, the product obtained from the second concentration stage is polymerized in the presence of conventional catalysts, regulators and other additives, if appropriate conjointly with other polyamide-forming starting compounds e.g. caprolactam, under conventional conditions, to give polymers having excellent properties. It is also possible to convert the concentrate, obtained according to the conditions of the invention, to e.g., flakes, and to carry out the polymerization in a different location and at a different time. However, in a preferred embodiment the polymerization is carried out immediately after concentration, and using a continuous polymerization process, whilst avoiding a prolonged residence time of the pure concentrates in the melt, and above all avoiding any contact with atmospheric oxygen. It has proved particularly advantageous to add, during the last concentration stage or immediately thereafter, e.g. before or after the material passes through the thin film evaporator, at least an equal amount, but preferably a two-fold amount or more, of caprolactam, based on solids content of the concentrate, in the form of a melt and to feed a continuous polymerization reactor with this mixture at from 80° to 150° C, preferably from 85° to 130° C, after admixture of conventional polymerization additives. The residence times at the stated temperatures, up to the polymerization stage, are kept at less than 60 hours and preferably less than 20 hours. A particularly preferred embodiment comprises concentrating in the last stage, e.g. in the thin film evaporator, to solids contents of more than 90 percent, and preferably more than 96 percent, by weight, and feeding the resulting concentrate directly into the supply vessel of a conventional precondensation tube. In a further advantageous embodiment, the concentrates obtained under the conditions of the invention are reacted, if appropriate with admixture of water and/or further polyamide-forming starting compounds and conventional additives, in a reactor at from 200° to 300° C under pressures above the vapor pressures of the system. The steam which forms during subsequent letting-down is removed and the polymer melt is fed directly into a conventional precondensation tube.

Surprisingly, the process of the invention gives polymers with excellent properties which are in no way inferior to those based on pure ε-caprolactam.

The advantage of the process of the invention is that it allows monomeric starting compounds to be converted to the extent of 100 percent into polymers, so that the process operates without creating wastes which pollute the environment.

It is surprising that using the process of the invention the oligomers contained in the extracts, amoungst which oligomers the dimer, in particular, is very stable, are cocondensed and that the products obtained according to the invention do not exhibit any properties deviating from the conventional prperties because of a modified molecular weight distribution. A further advantage of the process of the invention is that it is in the main carried out with homogeneous single-phase solutions of melts which are simple and trouble-free to handle. In particular, the dimer, which is known to have a high melting point, of above 300° C, and poor solubility remains in solution during the process of the invention, thereby avoiding products settling in pipelines and apparatuses, and avoiding blockages and problems of filtration.

EXAMPLE 1

Extract liquor containing 5.4 percent by weight of solids is taken from the extraction of a lactam-containing crude nylon 6 in an extraction made entirely of V2A steel and is concentrated to 50 percent strength by weight by distilling off water in the absence of atmospheric oxygen in a steam-heated kettle made of V2A steel. The steam used for heating is at 4 atmospheres gauge pressure. The concentrate obtained is subsequently fed to a Sambay thin film evaporator made of V2A steel. The evaporator is heated with dry steam at 6 atmospheres gauge pressure in the absence of atmospheric oxygen. After passing through the evaporator, a clear, colorless concentrate at 150° C, which contains less than 2 percent of water is obtained; this solidifies on a flaking roller to give pure white flakes.

4 parts of caprolactam and 1 part of water (Experiment A), or 4 parts of flakes and 1 part of water (Experiment B) are heated for 2 hours in an autoclave at 270° C and 20 atmospheres gauge pressure. The autoclave is then let down and the mixture is post-condensed for 2 hours at 275° C under a slight stream of nirogen. The amount of material extractable with hot water from the polymer obtained is 9.5 percent in case A) and 9.3 per cent in case B). The products obtained are extracted, dried and compounded with small amounts of seeding agents, on a twin-screw extruder, from which they are drawn off as strands which are chopped. The resulting granules are molded on an injection molding machine.

No difference in processing characteristics are observed between A) and B). The intrinsic color of the moldings is assessed visually and their length contraction is measured. Furthermore, the energy of fracture required to destroy the moldings is determined by a standardized method. The results are summarized in the Table which follows.

| TABLE ACCOMPANYING EXAMPLE 1 | | |
|---|---|---|
| | A | B |
| K value of the extracted material[1]) | 73.2 | 72.5 |
| K value after compounding | 72.4 | 72.9 |
| Injection molding to give box-shaped moldings (box dimensions 120 × 60 × 41 mm; wall thickness 1 mm) at 270° C material temperature | | |
| Color of test specimen | ivory | as for A |
| Shrinkage in length of molding | 0.43% | 0.43% |
| Energy of fracture $W_{50}$ required for definite destruction of the test specimen at 23° C[2]) | 280 cm.kp | 280 cm.kp |

[1])Determined by the method of H. Fikentscher, Cellulosechemie 13 (1932), 58, on a one per cent strength solution in concentrated sulfuric acid
[2])Determination analogous to DIN Draft 53,443, using box-shaped test specimens in place of discs.

EXAMPLE 2

The extract liquors obtained from the continuous extraction of crude nylon 6 containing lactam are collected in a stainless steel vessel heated to 70° C. The solids content of the liquors is from 6 to 8 percent by weight. The solution is fed continuously into a Luwa thin film evaporator which is made of stainless steel and is heated with dry steam at 15 atmospheres gauge in the absence of atmospheric oxygen. A clear melt is discharged from the thin film evaporator and is cooled under a nitrogen blanket, to give pure white flakes. The residual water content of this product is 2 percent.

The melting tank of a conventional precondensation tube is charged, in case A), with 100 parts of ε-caprolactam and 0.5 part of water, and in case B) with 75 parts of ε-caprolactam and 25 parts of the concentrate flakes. In each case the charge is melted and fed at 90° C into the precondensation tube. The temperatures in the individual zones of the precondensation tube are, in both case A) and case B), successively from top to bottom, 275° – 258° C, 269° – 270° C, 283° – 286° C and 249° – 251° C. The same rate of throughput is maintained in case A) and case B). The extractables and the end groups of the polymers thus obtained are measured. The polymers are then extracted with water and heated at 170° C. The data measured on the products are summarized in the Table which follows.

Both products are converted to 25 μ thick films. The films obtained had equivalent properties. No differences in processing characteristics were detectable.

| TABLE ACCOMPANYING EXAMPLE 2 | | |
|---|---|---|
| | A | B |
| Extractables after leaving the precondensation tube | 13.3 | 13.6 |
| K value after leaing the precondensation tube (10% higher sample weight) | 76.2 | 76.0 |
| End groups after leaving the precondensation tube | | |
| - COOH (equivalents/tonne) | 34 | 32 |
| - NH₂ (equivalents/tonne) | 40 | 41 |
| K value after extraction and heating | 86 | 87 |
| Reflectance[1]), % | 46 | 46 |
| Color number (APHA) | 7 – 10 | 7 – 10 |

[1])Total reflectance in the visible range measured on granules using a Zeiss RFC 3 color-measuring instrument.

EXAMPLE 3

The concentrate flakes, manufactured as described in Example 2, are used as the starting material for the following experiments. In case A), 100 parts of ε-caprolactam, 7 parts of water and 0.15 part of propionic acid are melted at 90° C. In case B), 67 parts of ε-caprolactam, 33.7 parts of flakes, 6.3 parts of water and 0.15 part of propionic acid are melted at 90° C. In case C), 102 parts of flakes, 5 parts of water and 0.15 part of propionic acid are melted at 140° C under superatmospheric nitrogen pressure. The melts obtained are pumped, at the rate of 30 1/hour, first through a heater in which they are heated to 268° – 272° C and then, for 30 minutes, through a tubular reactor at the same temperature under 20 atmospheres gauge pressure. After passing through this reactor, the products are let down to atmospheric pressure and charged into the top section of a conventional precondensation tube. In this top section, the steam formed is removed and the melt is heated at 275° – 277° C. The melt then passes through the individual zones of the precondensation tube which, successively from top to bottom, are at 270° C, 260° C and 250° C. The polymer melts obtained after the precondensation tube are extruded to form strands which are cooled and chopped.

For comparison, an extract which is collected in iron vessels and then worked up as described above is also used in case B). The data measured on the products obtained are summarized in the Table which follows.

| TABLE ACCOMPANYING EXAMPLE 3 | | | | |
|---|---|---|---|---|
| | A | B | Comparative experiment with B (iron collecting vessel) | C |
| End groups (equivalents/tonne) | | | | |
| COOH | 51.2 | 51.2 | 53.0 | 52.0 |
| NH₂ | 34.5 | 33.5 | 30.2 | 37 |
| Extractables (%) | 8.9 | 9.4 | 9.3 | 9.2 |
| Reflectance (%)[1]) | 52.0 | 52.0 | 44 | 40.3 |
| Fe content (ppm) | 0.5 | 0.5 | 5 | 1.0 |
| K value[2]) after extraction and drying | 71.5 | 72.3 | 71.3 | 71.5 |

[1])measured as in Example 2
[2])measured as in Example 1

We claim:
1. In a process for the manufacture of polyamides from ε-caprolactam and/or other polyamide-forming starting compounds by polymerization and subsequent extraction of the polymer, the improvement comprising: concentrating the aqueous extract containing water, monomer and oligomers in the absence of atmospheric oxygen, wherein the surfaces which comes into contact with the extract are made of materials which are inert under the conditions of the concentration process, and polymerizing the concentrate, without further purification or separation, by itself or together with other polyamide-forming starting materials.

2. A process as claimed in claim 1, wherein continuous operation is employed and the extract, after having been concentrated, is recycled to the polymerization stage.

3. A process as claimed in claim 1, wherein the surfaces which comes into contact with the extract are made of stainless steel.

4. A process as claimed in claim 1, wherein the extract liquors are concentrated in several stages, temperatures of from 130° to 210° C are employed at solids contents above 50% and the residence times at these temperatures are kept at below 30 minutes.

5. A process as claimed in claim 4, wherein the residence time is kept at below 10 minutes.

6. A process as claimed in claim 1, wherein the concentrating is carried out in thin film evaporators, at least when the solids concentration is above 50%.

7. A process as claimed in claim 1, wherein, during or immediately after concentrating, more than an equal amount, based on solids content, of lactam is added to the extract liquors, and, after concentrating and mixing, temperatures of from 80° to 150° C and residence times of less than 40 hours are maintained up to the polymerization.

8. A process as claimed in claim 1, wherein the extracts are concentrated to solids contents of above 90% and the polymerization is carried out continuously under atmospheric pressure in a precondensation tube.

9. A process as claimed in claim 1, wherein the concentrated extracts, if appropriate together with other polyamide-forming starting compounds and with water which either has not been completely removed during concentrating or has subsequently been added back, are first heated at from 200° to 300° C under pressures higher than the vapor pressure of the mixture and are then let down, the steam formed is separated off and the melt is fed to a conventional precondensation tube.

* * * * *